United States Patent

Campbell

[15] 3,680,930
[45] Aug. 1, 1972

[54] SPHERICAL BEARING CONSTRUCTION

[72] Inventor: James R. Campbell, South Laguna, Calif.

[73] Assignee: Armco Steel Corporation, Middletown, Ohio ; a part interest

[22] Filed: May 22, 1970

[21] Appl. No.: 39,579

[52] U.S. Cl. ................................................. 308/72
[51] Int. Cl. ............................................. F16c 13/04
[58] Field of Search ....................................... 308/72

[56] References Cited

UNITED STATES PATENTS

| | | | |
|---|---|---|---|
| 2,753,225 | 7/1956 | Gilmer | 308/72 |
| 3,240,502 | 3/1966 | Snyder | 308/72 |
| 3,482,890 | 12/1969 | Burrell | 308/72 |

*Primary Examiner*—Martin P. Schwadron
*Assistant Examiner*—Frank Susko
*Attorney*—Fulwider, Patton, Rieber, Lee & Utecht

[57] ABSTRACT

Spherical bearings are provided which include a socket incorporating a spherical race and spherical bearing member which is fabricated from a continuous helix threadably inserted into the spherical race of the socket. The ball and socket construction can be incorporated in such structures as rod end bearings or in any applications where movement of the ball with respect to the socket is indicated.

The method of fabricating the spherical bearing member includes the steps of forming a helix, compressing the coils of the helix into engagement with one another and generating a spherical surface on the exterior surface of the helix to provide the spherical bearing member. The helix may be fabricated from an appropriate size of strip stock or, may be alternatively fabricated by the generation of the helix on a cylindrical body from which it is subsequently stripped. The latter method of fabricating the helix is particularly suitable where materials in strip form for forming the helix are not sufficiently ductile.

17 Claims, 17 Drawing Figures

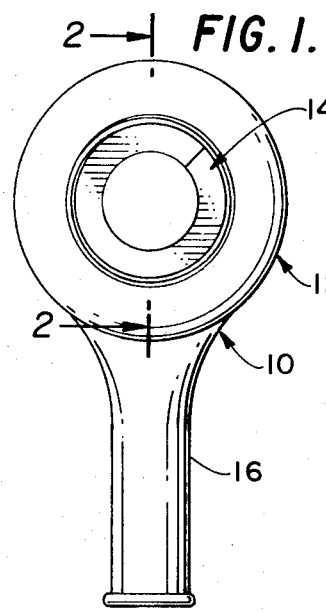
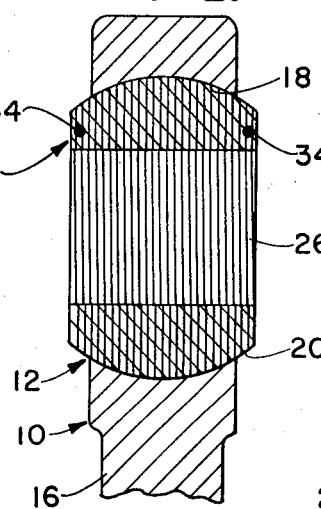
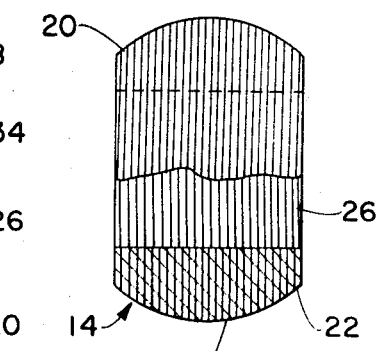
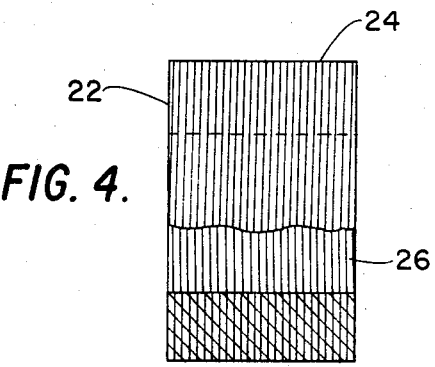
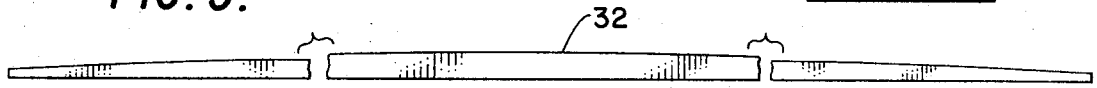
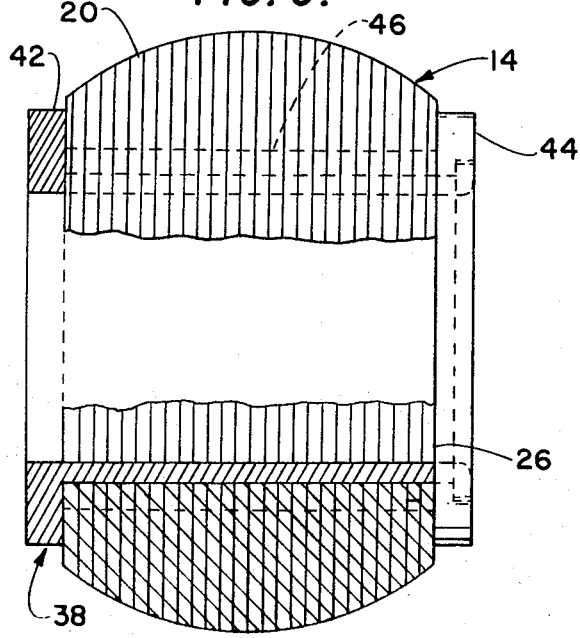
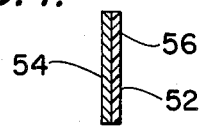
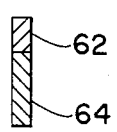
INVENTOR.
JAMES R. CAMPBELL
BY MAHONEY, HORNBAKER
AND SCHICK
ATTORNEYS

INVENTOR.
JAMES R. CAMPBELL
BY MAHONEY, HORNBAKER
AND SCHICK
ATTORNEYS

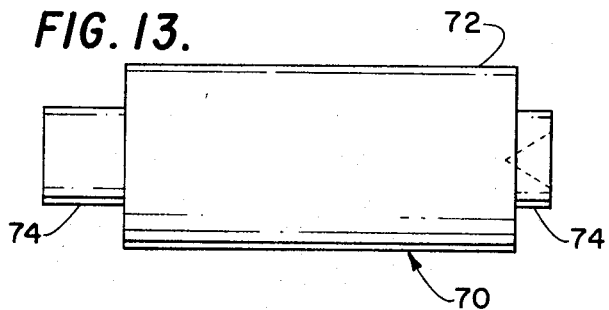
FIG. 13.
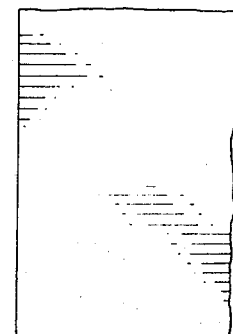
FIG. 14.
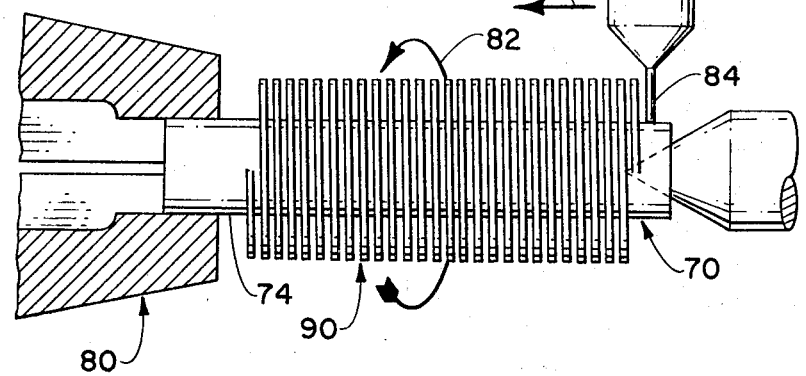
FIG. 15.
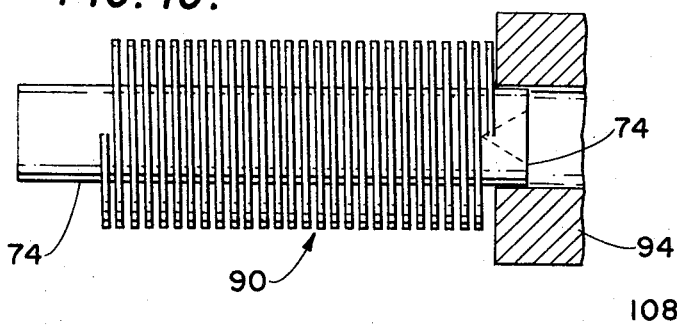
FIG. 16.
FIG. 17.
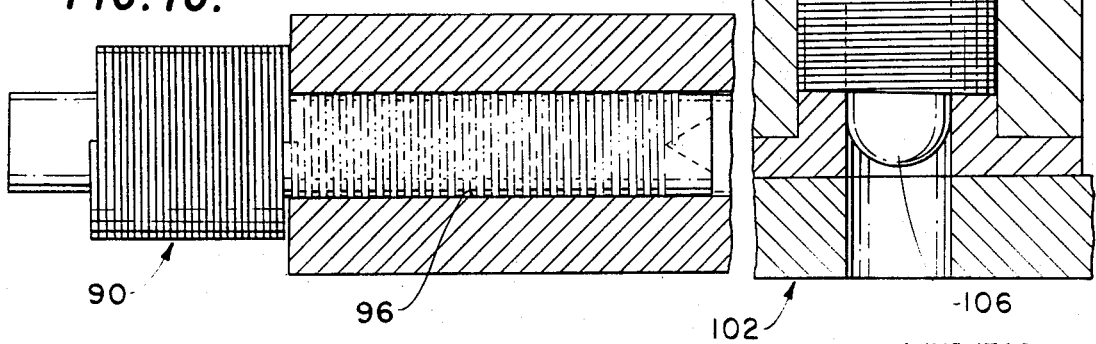

SPHERICAL BEARING CONSTRUCTION

BACKGROUND OF THE INVENTION

This invention relates to a spherical bearing construction and to methods of fabricating the same and is directed particularly to bearings of the ball and socket type wherein the socket incorporates a spherically-generated race and wherein the spherically-generated race is adapted to receive a correspondingly generated spherical bearing member.

Devices of this type are frequently incorporated in structures known as rod end bearings wherein the ball and socket are connected to the extremity of a rod or linkage to provide a universal connection with another object. They are used extensively in controlled linkage systems and other mechanisms to provide articulated joints between the links, levers and the like with which they are associated. The spherical ball and socket construction has the advantage of providing, within predetermined limits, universal angulation or swivelling of the linkage members to accomplish self-alignment of the associated moving parts.

Spherical bearings of the type under consideration are applied in linkage systems because they eliminate looseness and slop by virtue of their relatively large ball and socket bearing surfaces and their relatively precise fit. In addition, the limited angulation or swivel action provided by such bearings eliminates binding and undesirable loads from linkage systems in which they are incorporated.

In order to illustrate the construction and mode of operation of the spherical bearing of the invention, it will be described as incorporated in a rod end bearing construction but it will be obvious to those skilled in the art that the teachings of the invention may be applied with equal cogency to other bearing applications and it is not intended to limit the bearing construction of the invention or the method thereof to the specific embodiment disclosed and described herein.

There are numerous rod end bearing on the market at the present time, but all of them appear to be subject to certain deficiencies which detract seriously from their continued efficient performance. Most rod end bearings are assembled by press fitting or swaging operations under heavy pressure.

Generally speaking, the spherical bearing member is fabricated separately from the spherical socket intended to receive it and is subsequently inserted in the spherical socket which may be provided with one flanged side and one open side. The open side is subsequently swaged into overlying relationship with the contiguous end of the spherical bearing member to contain it in the spherical socket.

Because of the difficulty of controlling the swaging process, the spherical bearing member is frequently too loosely or too tightly contained in the spherical socket so that the initial fit between the spherical bearing member and the spherical socket cannot be maintained to close limits of tolerance. Consequently, some of the bearings are fitted too tightly while others are too close.

If the spherical bearing member is too tightly fixed in the corresponding spherical socket, excessive wear, stiffness of movement and premature failure of the bearing will occur unless a lapping operation is performed. Similarly, if the spherical bearing member is too loosely secured in the corresponding spherical socket, undesirable looseness in the linkage will occur accompanied by excessive play of the spherical bearing member in the socket and consequent fretting which ultimately results in premature failure of the bearing.

OBJECTS AND SUMMARY OF THE INVENTION

It is, therefore, an object of the invention to provide a ball and socket bearing in which the spherical ball member is inserted into the spherical socket member without the utilization of a swaging process or any similar process which will entail resulting uncertainty as to the tolerance to be maintained between the periphery of the spherical ball member and the corresponding spherical race in the socket member.

Another disadvantage of conventional rod end bearing constructions is the fact that once the spherical bearing member becomes worn, it is impossible to remove and replace the worn spherical bearing member with a new spherical bearing member.

Another problem encountered with conventional ball and socket rod end bearing constructions which are fabricated by swaging the spherical bearing member in the spherical socket is the problem of utilizing materials which are specifically suited for the applications in which the rod end bearing is to be utilized. For instance, in the swaged constructions, it is necessary to utilize metals in the spherical socket member which can be readily swaged into overlying relationship with the juxtaposed side or extremity of the spherical bearing member. Such metals susceptible to swaging are not necessarily those most suitable for particular applications where anti-galling characteristics, elevated temperatures or other ambient phenomena of an extreme nature may be encountered. In addition, it is quite common to fabricate, for reasons of economy, the spherical ball members or the race from sintered metal or the like.

Such sintered spherical bearing members are susceptible to excessive wear and to relatively premature deterioration which results in the necessity for discarding the entire assemblage. In addition, it is almost impossible to fabricate the external sphericity of the ball member into precise correspondence with the sphericity of the race of the socket member.

As an alternative to swaging the spherical socket in operative relationship with the spherical bearing member, certain ball and socket bearings are fabricated by providing a slot in a side wall of the spherical socket and inserting a suitably formed spherical bearing member thorough the orifice. Subsequently, the spherical bearing member is adjusted in the socket to prevent it from being released therefrom without the deliberate intent of a person disassembling the spherical bearing member from the spherical socket.

Unfortunately, the utilization of this type of construction produces stress concentrations in the spherical socket since a significant notch effect is created by the insertion orifice or slot in the spherical socket.

Consequently, conventional ball and socket bearings are characterized by the fact that the types of metals which can be utilized in the ball and socket are limited by the necessity for swaging the socket in operative relationship with the ball or by the necessity for providing a loose fit between the ball and socket attributable to the insertion of the ball to access openings in the side of the socket or to grooves in ball surface to provide admittance into the race. In addition, where the ball is swaged in operative relationship with the socket, close tolerances cannot be achieved because of the unpredictability of the swaging operation. Moreover, the ball or socket cannot be removed from operative relationship with each other if they have been swaged together and the entire assemblage must be discarded.

It is, therefore, a further object of the invention to provide a ball and socket bearing wherein the spherical bearing member is fabricated from a continuous helix having a spherical surface generated on the external surface thereof and wherein the spherical socket member is adapted to have the helical spherical bearing member threaded into operative engagement with it thus eliminating the swaging operation or the insertion openings incorporated in prior art constructions.

A further object of the invention is that a spherical bearing can be produced which is, due to the lack of residual stresses caused in manufacture and the absence of stress risers due to notches, structurally more efficient and thus smaller and lighter than conventional spherical bearings.

A natural concomitant of the above described ball and socket bearing construction is that the spherical socket and spherical bearing member can be fabricated from any desired material so long as the spherical socket can be forged or otherwise shaped from the desired material and so long as the material of the spherical ball member is susceptible of formation in a helical configuration.

Another object of the invention is the provision of a ball and socket bearing construction wherein the external sphericity of the spherical bearing member can conform precisely to the internal sphericity of the socket member due to the fact that the corresponding sphericities can be determined prior to the threadable insertion of the spherical bearing member into operative relationship with the corresponding spherical bearing surface of the socket member.

Consequently, the lack of precision and the sloppiness characteristic of prior devices are eliminated and the consequent excessive and premature wear of the ball and socket bearing construction is obviated.

An additional advantage of the construction of the invention lies in the fact that the helically configured spherical ball member can be as readily removed from the socket member as it is inserted therein by simply threading outwardly from the socket member. Therefore, if, for any reason, the necessity for replacing either ball or socket member occurs, it can be readily accomplished without the necessity for discarding the entire assembly.

Another object of the invention is the provision of a helically configured spherical ball member for use in conjunction with a correspondingly configured socket member which is fabricated from a composite material, that is, wherein the helix is coated with a suitable coating, such as trifluroethylene sold under the trademark Teflon or wherein the material utilized is constituted by a laminate of dissimilar or corresponding metals.

In addition, the corresponding and adjacent coils of the helix are particularly adapted for reception of various types of lubricants which materially enhances the viable life of the ball and socket assemblage in which the helical ball member is inserted.

An additional object of the invention is a method of fabricating a ball and socket bearing construction wherein a helix is created from a desired metal or other material and wherein the adjacent coils or turns of the helix are compressed into contact with one another to permit a spherical surface to be generated on the compressed helix. The helical ball member is then threaded into a correspondingly spherical socket and is retained in operative relationship with said socket until the deliberate removal of the ball member from operative relationship with the socket member.

An additional object of the invention is the provision of a ball and socket member of the preceding character wherein the spherically generated helical ball incorporates a bore and a bushing is inserted in said bore adapted to maintain a shaft, bolt, or other member in operative relationship with the ball member. In order to prevent relative rotation between the bushing and the bore of the helically generated ball member, the bore of the helix and the periphery of the bushing may be correspondingly splined or otherwise joined in operative non-rotatable relationship.

Another object of the invention is that various "hard surfaces", incapable of being deformed without cracking or chipping or flaking, may be readily applied to either or both the race surface or the ball surface, precisely finished to contour and subsequently assembled into a finished article without damage to the "hard surface".

An additional object of the invention is the provision of a spherical bearing with a predetermined amount of preload between ball and race which can be produced for applications requiring zero play or zero "mushing" of a plastic interface.

Other objects and advantages of the invention will be apparent from the following specification and the accompanying drawings which are for the purpose of illustration only.

BRIEF DESCRIPTION OF THE DRAWINGS

FIG. 1 is a side elevational view of a rod end bearing incorporating the teachings of the invention;

FIG. 2 is a vertical sectional view taken on the broken line 2—2 of the FIG. 1;

FIG. 3 is a vertical, partly sectional view of the ball member of the rod end bearing;

FIG. 4 is a vertical, partly sectional view of a compressed helical member prior to the generation of the spherical surfaces thereupon to provide the ball member of FIG. 3;

FIG. 5 is a developmental view showing the typical reduction in the radial width of the strip incorporated in the helix resulting from the generation of the spherical external surface thereupon;

FIG. 6 is an enlarged, partly sectional view of the ball member having a bushing associated therewith, it being understood that the bushing is inserted in the ball member after the insertion of the ball member in the corresponding socket;

FIG. 7 is a vertical, enlarged sectional view showing a typical laminated metallic composite material adapted to be utilized in the helix strip;

FIG. 8 is an enlarged, vertical sectional view showing a laminated composite strip construction similar to FIG. 7;

FIG. 13 illustrates a substantially cylindrical blank of metal which can be utilized in fabricating a helix intended to constitute the helical ball member;

FIG. 14 illustrates the step of cutting the helix;

FIG. 15 illustrates the initial step of severing the helix from the core of the cylindrical blank;

FIG. 16 illustrates the severance of the helix from the core; and

FIG. 17 illustrates the step of compressing the helix prior to the spherical generation thereof.

DESCRIPTION OF THE BEST EMBODIMENTS CONTEMPLATED

Figure 9:
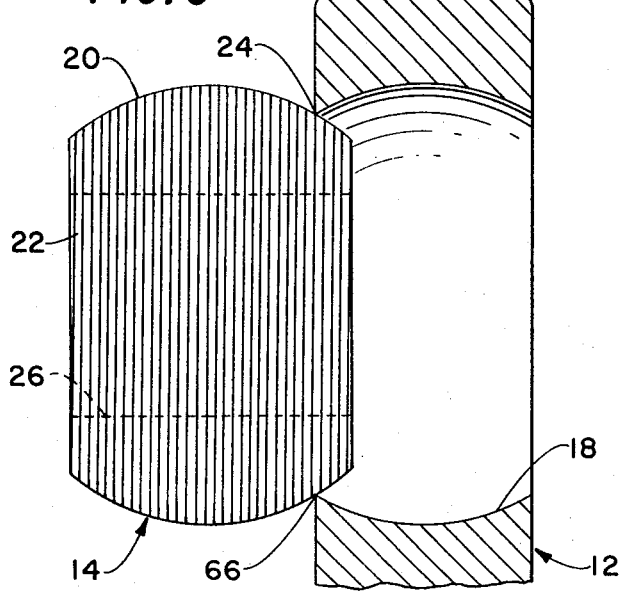
FIG. 9 is a vertical, sectional view showing the initial insertion of the ball member in operative relationship with the socket member.

Referring to the drawings and particularly to FIGS. 1-2 thereof, of show a ball and socket rod end bearing 10 which includes a socket member 12 and a ball member 14 mounted in the socket member 12. The socket member 12 has an extension 16 which may be threaded or otherwise configured to receive the corresponding extremity of a rod, link or other element intended to have the rod end bearing 10 mounted thereupon. The socket member 12 has a spherically configured race 18 provided therein for the reception of the correspondingly spherically configured external surface 20 of the ball member 14.

The ball member 14 is formed from a compressed helical member 22, the coils or turns 24 of the helix being compressed in operative relationship with each other in a manner to be described in greater detail below. The helix 22 defines a bore 26 for the reception of a corresponding shaft or bolt shank or other cylindrically configured member adapted to be inserted therein.

The helix may be fabricated from strip material by conventional spring winding techniques, although it will be necessary to compress the coils or turns 24 of the helix into engagement with one another and to establish a precision I.D. prior to generating the external spherical surface upon the helix.

In any event, after the fabrication of the helix in the cylindrical configuration shown in FIG. 4 of the drawings, the spherical outer surface 20 is ground or cut upon the helix while it is maintained in the compressed condition shown in FIG. 4. Because of the fact that the spherical outer surface 20 is fabricated by grinding or cutting the same upon the external surface of the helix, tolerances may be maintained between the spherical race 18 of the socket member 12 and the spherically generated outer surface 20 of the ball member 14 which cannot be achieved with other ball and socket constructions.

After the generation of the spherical surface 20 on the helix 22, the ball member 14 is ready for insertion into the corresponding race 18 of the socket member 12. However, if the corresponding coils or turns 24 of the helix 22 were unwound into a flat strip similar to that from which they were wound, the development would be similar to that shown in the strip 32 of FIG. 5 wherein the outer extremities of the strip 32 represent the most severely cut or ground portions of the strip while the intermediate section of the strip represents the intermediate section of the ball member 14.

Prior to the compacting or compressing of the coils or turns 24 of the helix 22 into operative engagement with one another, the opposite extremities of the helix are rough ground to eliminate the possibility that the extremities of the helix might cause the deformation of adjacent coils or turns of the helix 22 when the helix 22 is placed in a press or die to bring the adjacent coils or turns 24 of the helix into operative engagement with one another. Furthermore, since the grinding of the extremities of the helix 22 substantially reduces the cross section thereof, said extremities are spot welded to the adjacent turns or coils 24, as best shown at 34 in FIG. 2 of the drawings. It is desirable that the last two or three turns or coils on each end of the helix be spot or fusion welded to each other to provide stability of the feather edged portion of the last turn.

The helical ball member 14 is shown in FIG. 6 as having a bushing 38 mounted in the bore 26 thereof. The bushing is of cylindrical configuration and has a preformed flange 42 adapted to abut the left-hand extremity of the helical ball member 14. The right-hand extremity of the bushing is adapted to be swaged over a corresponding washer 44 to maintain the bushing in operative relationship with the bore 26 of the helical ball member 14. In addition, to prevent relative rotation between the bushing 38 and the adjacent wall of the bore 26, the bushing may be provided with one or more splines 46 which are engaged in corresponding slots or recesses formed in the wall of the bore 26. Therefore, relative rotation between the bushing 38 and the wall of the bore 26 is prevented which insures that the rotation of a shaft within the bore of the bushing 38 will not tend to cause the distortion of the helical ball member 14. Furthermore, the bushing 38 tends to maintain the adjacent turns or coils of the helix 22 in intimate engagement with one another to insure that the spherically generated surface 20 will be integrally maintained in engagement with the corresponding race 18, particularly in applications wherein it is desired to have little or no bolt up load on the ball.

It is contemplated that any type of metallic material may be utilized in fabricating the ball member 14. If the material is metal, it can be wound as a flat wound spring on conventional spring winders so long as it has twenty per cent or more elongation at room temperature. If the materials are extremely hard and with less than twenty per cent elongation, an alternative method of fabricating the initial continuous helix 22 is utilized, said method to be described in greater detail hereinbelow. Of course, it is not intended that the teachings of the invention be limited to the utilization of any particular metallic material since it is conceivable that other materials, such as suitable plastics, might be utilized and that such techniques as injection molding be applied in the fabrication of the continuous helix 22.

Furthermore, it is also contemplated that the spring strip from which the helix 22 is fabricated may be coated with various types of materials, such as trifluroethylene, to provide self-lubricating characteristics or that the strip may be coated with other types of semi-permanent lubricants, such as lubricants incorporating a high percentage of molybdenum.

Moreover, bimetallic spring strips, such as the strip 52, shown in FIG. 7 of the drawings, may be utilized to achieve desirable bearing action resulting from the cooperative relationship of laminated metals 54 and 56. In addition, end laminations such as the end lamination 62 are provided on the strip 64 of FIG. 8.

Figure 10:
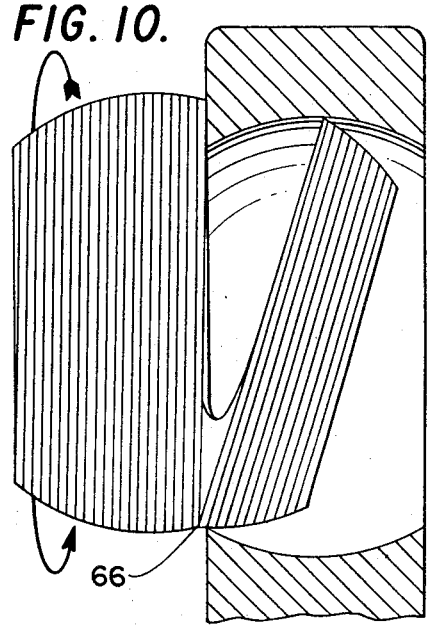
FIG. 10 shows the further insertion of the ball member.
Figure 11:
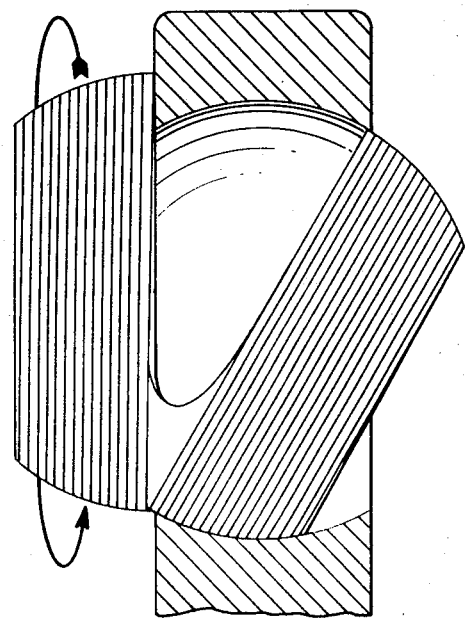
FIG. 11 shows continued insertion of the ball member.
Figure 12:
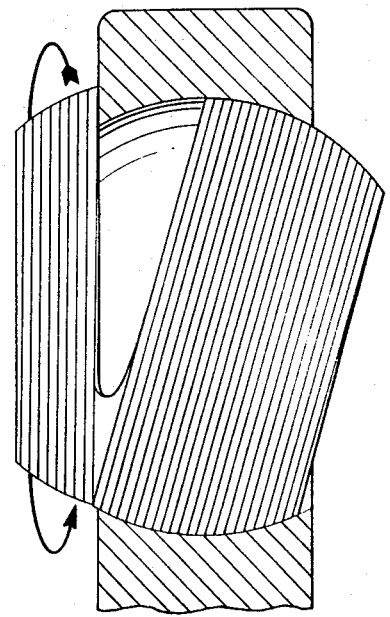
FIG. 12 shows almost complete insertion of the ball member.

The successive steps of insertion of the ball member 14 into operative engagement with the race 18 of the socket member 12 are illustrated in FIGS. 9–12 of the drawings. Initial engagement of the right-hand extremity of the ball member 14 brings one of the right-hand turns or coils 24 of the helix 22 into operative engagement with the corresponding edge 66 of the race 18 of the socket member 12. Continued rotation of the ball member 14 will cause the successive engagement of the edge 66 of the race 18 with successive convolutions or turns 24 of the helix 22 to progressively draw the successive convolution or turns 24 of the helix 22 into the race 18 of the socket member 12.

The insertion of the ball member 14 into operative engagement with the race 18 of the socket member 12 can be accomplished by engagement of the left-hand extremity of the ball member 14 by a mandrel which fits within the bore 26 of the ball member 14. This can be a hand tool or the insertion of the ball member 14 can be accomplished by suitable automatic devices. In any event, it should be noted that, for most applications, the convolutions of the helix 22 are left-hand wound for use with right-hand threaded bolts and standard machine tool configurations during manufacture. The helix can be right-hand wound but it is preferred to use the left-hand configuration.

As previously indicated, the method of the invention includes steps entailing the fabrication of the helix of the ball member 14 from materials of low elongation and considerable hardness, such as titanium alloys, stellite, and the like.

In practicing the method of helix fabrication shown successively in FIGS. 13–17 of the drawings, a blank 70 of the desired material is provided, said blank having a central cylindrical portion 72 from which the helix is to be cut and having reduced extremities 74 which define the rough diameter of the bore of the helix to be formed and which constitute the extremities of the ultimate core member ejected from the helix, in a manner to be described in greater detail below.

The blank is mounted in a machine tool indicated generally at 80 whereby it may be rotated in the direction of the arrow 82 to be operated upon by a cutter 84 traveling in the direction of the arrow 86 to form the helix 90. It should be noted that the showing in FIG. 14 is reversed and shows a right-hand wound helix, this showing being for the purpose of illustration only since it is preferable that the helix be cut in a left-hand configuration for the reason previously given hereinabove.

The length of the central cylindrical portion 72 of the blank 70 determines the number of turns or convolutions to be formed in the helix 90 plus the allowance required for compacting and for grinding the extremities of the helix 90 and for the possible coating or other treatment of the successive convolutions of the helix 90.

In addition to utilizing conventional cutting tools, such as the cutting tool 84, it is also possible to utilize grinders or similar devices or to utilize suitable abrasive discs in cutting the helix. After the cutting of the helix 90 has been completed, the blank 70 with the helix 90 still secured thereto is placed in a die which includes a ram 94. The end of the ram 94 is moved into engagement with the adjacent reduced extremity 74 of the blank 70 and the opposite extremity 74 is restrained against movement as the ram 94 moves against the corresponding extremity of the helix 90 to strip the helix 90 from the resultant core 96.

After the helix 90 has been stripped from the core 96, the end turns are rough ground flat before compacting to avoid the coining of a depression by the ends of the helix into the adjacent convolutions of the helix 90. The helix 90 is then placed in a compacting or compressing die 102 in which the successive convolutions or turns 104 thereof are driven into positive engagement with one another. The pilot 106 of the die 102 is slightly undersized and the die ring 108 of the die 102 is slightly oversized to allow a small amount of metal flow after the punch 112 has compressed the helix 90. 90. The outer diameter equals that of the die ring internal diameter and the internal diameter is reduced to the outer diameter of the pilot 106.

Therefore, the ball member 14 can be fabricated from a wound helix 22 or a cut helix 90 depending on the elongation characteristics of the metal being utilized. However, once the helix has been fabricated the successive steps of treatment of the helix are basically the same with the exception that the compacting step illustrated in FIG. 17 is accomplished at room temperature with materials of 7.5 percent or more elongation and at temperatures greater than room temperature depending on the materials with an elongation less than 7.5 percent.

After the compacting step has been accomplished, the bore 26 is formed in the helix. Subsequently, the two coils or more at the opposite extremities of the helix are spot or fusion welded and the last coil at each extremity is ground to provide a substantially vertical surface at each extremity and a precise bearing width.

The resulting cylindrical helix is then placed on a spherical grinder and the rough sphericity of the ball member 14 is achieved by machining or grinding. The finished spherical ball member 14 is achieved by grinding, burnishing or single pointing of the spherical outer surface thereof.

If desired, the successive step of coating the resulting helical ball member with a plastic coating such as trifluroethylene or with a suitable lubricant may take place.

The ball member can then be inserted in the race 18 of the corresponding socket member 12 and the bushing 38 inserted in the bore of the ball member 14.

I thus provide by my invention a ball and socket rod end bearing construction wherein the ball member is constituted by a continuous helix which is threadedly engaged in the corresponding race of the socket member and threadedly removable therefrom. I also provide methods of fabricating the ball member from a continuous helix and of fabricating the helix prior to the formation of the spherical surface of the ball member.

As previously indicated, the elimination of the swaging of the socket member to retain the ball member in operative relationship therewith permits the utilization of any desired material for the socket member. In addition, the precise formation of the ball member permits tolerances to be achieved between the spherical surface of the ball member in the corresponding race of the socket member which have not been attainable in prior art devices.

Moreover, because the assembly of the components of the ball and socket bearing does not entail the modification of the structure of either the ball member or the socket member, a wide variety and range of materials can be provided which could not be obtained in prior art devices. Moreover, the specific method of fabricating the ball member permits the utilization of materials and combinations of materials and lubricants unattainable by prior art constructions.

I claim:

1. A spherical bearing comprising, in combination:
   a one-piece annular socket member having a preformed, part-spherical internal race and a circular opening on each side of said race substantially smaller in diameter than the diameter of the race;
   a ball member disposed in said socket member and having a part-spherical outer surface in close-fitting relation with said race, said outer surface having a diameter substantially larger than the diameters of said openings so as to be confined rotatably in said socket;
   said ball member comprising a continuous helix composed of convolutions having shaped outer sides cooperating to form said part-spherical outer surface, and at least the convolutions larger than said openings being free to permit successive convolutions to be drawn into the socket member through one of said openings during relative rotary movement of said ball and socket members with the ball member in engagement with the socket member in said one opening.

2. A bearing as defined in claim 1 in which said ball member has a through bore defined by the inner sides of said convolutions.

3. A bearing as defined in claim 1 in which said ball member has flat end surfaces formed by the final convolutions adjacent the extremities of said helix, and said extremities are feather-edged to form said flat end surfaces, and further including means securing at least two convolutions of said helix together at each end to provide stability of the feather-edged portions.

4. A bearing as defined in claim 1 in which said helix is a flat wound spring having a machined outside surface.

5. A bearing as defined in claim 1 further including means for holding said convolutions together after installation of said ball member in said socket member.

6. A bearing as defined in claim 5 in which said ball member has a bore therethrough defined by the inner sides of said convolutions, and said holding means include a bushing telescoped into said bore after assembly of said ball member in said socket member.

7. A bearing as defined in claim 6 in which said bushing has ends abutting against said ball member at the opposite ends of said bore and holding said convolutions against movement away from each other.

8. A bearing as defined in claim 6 in which said bushing is spline-coupled to said ball to prevent relative rotation between the bushing and said convolutions.

9. A bearing as defined in claim 8 in which at least two convolutions of said helix are secured together adjacent each end of said bore.

10. A bearing as defined in claim 1 in which at least one of said openings is defined by a circular edge which acts as a thread for drawing successive convolutions into said socket member.

11. The combination of:
    a housing having a part-spherical socket of preselected diameter therein, and an opening into at least one side of said socket smaller than said preselected diameter, said socket being defined by a single, integral part of said housing;
    and a ball disposed in said socket and having an outside surface with a diameter larger than said opening, said ball comprising a helix composed of convolutions having outer sides forming said outside surfaces and assembled in said housing with at least the convolutions larger than said opening free to deflect and be drawn into the socket upon relative movement of the housing and the ball with the latter pressed against said opening.

12. The combination as defined in claim 11 in which said single, integral part of said housing defines an annular race with said opening on one side of said race and with the side of said race opposite said opening closed to at least a diameter smaller than the diameter of said ball, whereby the latter is confined rotatably in said race by said single integral part.

13. The combination as defined in claim 12 in which said opening is defined by a circular edge of smaller diameter than the diameter of said ball, and engageable with the convolutions of said helix during relative rotation thereof to draw successive convolutions into said socket until the ball is rotatably confined in said socket.

14. The combination as defined in claim 12 further including means for holding said convolutions together, independent of said housing, after installation of said ball in said socket.

15. The combination as defined in claim 14 in which said ball has a through bore defined by the inner edges of said convolutions, and said holding means include a bushing fitted tightly in said bore.

16. The combination as defined in claim 15 in which said bushing has means on its opposite ends clamping said convolutions together.

17. In a bearing, the combination of: a one-piece housing defining a spherical socket of preselected diameter and having an opening on one side smaller than said preselected diameter; and a spherical bearing threadedly inserted into said socket through said opening and comprising a helix having an outer spherical surface larger than any opening into said socket and corresponding to the sphericity of said socket.

* * * * *

PO-1050
(5/69)

UNITED STATES PATENT OFFICE
CERTIFICATE OF CORRECTION

Patent No. 3,680,930            Dated August 1, 1972

Inventor(s) James R. Campbell

It is certified that error appears in the above-identified patent and that said Letters Patent are hereby corrected as shown below:

Column 1, line 41, delete "bearing" and substitute therefor

--bearings--.

Column 4, lines 1-11, delete the entire paragraph.

Column 5, line 25, delete "of" and substitute therefor

--I--.

Signed and sealed this 1st day of May 1973.

(SEAL)
Attest:

EDWARD M. FLETCHER, JR.      ROBERT GOTTSCHALK
Attesting Officer              Commissioner of Patents